United States Patent
Ishihara et al.

(10) Patent No.: US 10,473,062 B2
(45) Date of Patent: Nov. 12, 2019

(54) FUEL VAPOR PROCESSING DEVICE

(71) Applicant: DENSO CORPORATION, Kariya, Aichi-pref. (JP)

(72) Inventors: Keiichirou Ishihara, Kariya (JP); Tomohiro Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 4 days.

(21) Appl. No.: 16/033,292

(22) Filed: Jul. 12, 2018

(65) Prior Publication Data
US 2019/0040821 A1   Feb. 7, 2019

(30) Foreign Application Priority Data
Aug. 3, 2017 (JP) ................. 2017-150804

(51) Int. Cl.
*F02M 25/08* (2006.01)

(52) U.S. Cl.
CPC .... *F02M 25/0818* (2013.01); *F02M 25/0836* (2013.01)

(58) Field of Classification Search
CPC ............. F02M 25/089; F02M 25/0854; F02M 25/0818; F02M 25/0836; F02M 25/0809; F02M 2025/0845; B60K 15/03519; F02D 41/004; G01M 3/02; G01M 3/2876
See application file for complete search history.

(56) References Cited

U.S. PATENT DOCUMENTS

| | | | |
|---|---|---|---|
| 5,890,474 A | 4/1999 | Schnaibel et al. | |
| 8,273,074 B2* | 9/2012 | Jaeb | A61M 1/0005 604/19 |
| 2007/0062495 A1* | 3/2007 | Kano | F02D 41/0045 123/520 |
| 2014/0182360 A1 | 7/2014 | Horiba | |
| 2017/0030302 A1* | 2/2017 | Takezawa | B60K 15/03006 |
| 2018/0195445 A1* | 7/2018 | Iriyama | F02D 41/004 |

* cited by examiner

*Primary Examiner* — George C Jin
(74) *Attorney, Agent, or Firm* — Nixon & Vanderhye PC

(57) ABSTRACT

A fuel vapor processing device includes a three-way valve having a common valve chamber in which a first valve body, a second valve body, and a third valve body are housed. A single pressure sensor is provided in the common valve chamber. The first valve body enables communication between the common valve chamber and a first valve chamber. The second valve body enables communication between the common valve chamber and a second valve chamber communicating with an inside of the canister. The third valve body enables communication between the common valve chamber and a third valve chamber communicating with an inside of a fuel tank. An ECU controls the three-way valve and a switching valve, and controls driving of a pump to perform fuel vapor leak diagnosis for the fuel tank and the canister, based on a detection value detected by the pressure sensor.

13 Claims, 17 Drawing Sheets

FUEL VAPOR PROCESSING DEVICE

CROSS REFERENCE TO RELATED APPLICATION

This application is based on Japanese Patent Application No. 2017-150804 filed on Aug. 3, 2017, the disclosure of which is incorporated herein by reference.

TECHNICAL FIELD

The present disclosure relates to a fuel vapor processing device.

BACKGROUND ART

It is conventionally known that a fuel vapor processing device is capable of recovering fuel vapor from a fuel tank, and supplying the recovered fuel vapor to an intake system of an internal combustion engine. The fuel vapor processing device of this type has a diagnosis function for diagnosing a leak from a fuel vapor processing system. For example, a fuel vapor processing device described in JP 2014-126006 A includes a sealing valve that seals a fuel tank from the atmosphere, a canister that recovers fuel vapor, a canister internal pressure sensor, a tank internal pressure sensor, and others. The fuel vapor processing device is configured to perform a leakage diagnosis for a fuel vapor processing system based on detection values of the canister internal pressure sensor and the tank internal pressure sensor, and perform a diagnosis for the sealing valve.

The fuel vapor processing device described in JP 2014-126006 A has separate sensors for the fuel tank internal pressure detection and the canister internal pressure detection to determine the presence or absence of a fuel vapor leak from the fuel tank and the presence or absence of a fuel vapor leak from the canister. Accordingly, the fuel vapor processing device uses two pressure sensors in total. This configuration requires a sufficient number of harnesses for the pressure sensors to cause electrical continuity between an electronic control unit (ECU) and the respective pressure sensors. In this case, a problem of a complicated device configuration may arise.

SUMMARY

An object of the present disclosure is to provide a fuel vapor processing device that has a simplified device configuration.

A fuel vapor processing device according to the present disclosure includes a canister that absorbs fuel vapor discharged from a fuel tank mounted on a vehicle, a switching valve, a pressurizing/depressurizing unit, a valve mechanism unit, a pressure detection unit, and a control unit. The switching valve is provided in an atmosphere path that communicatively connects the canister and the atmosphere. The switching valve switches between a state where the canister is communicatively connected to the atmosphere, and a state where the canister is isolated from the atmosphere. The pressurizing/depressurizing unit pressurizes or depressurizes at least any one of the fuel tank, the canister, and a bypass path that extends from the atmosphere path while bypassing the switching valve and that has an orifice at an intermediate position of the bypass path. The valve mechanism unit includes a common valve chamber that houses a first valve body, a second valve body, and a third valve body. The pressure detection unit is provided in the common valve chamber. The control unit controls the valve mechanism unit and the switching valve, and controls driving of the pressurizing/depressurizing unit to perform a fuel vapor leak diagnosis for the fuel tank and the canister based on a detection value detected by the pressure detection unit.

The first valve body enables communication between the common valve chamber and a first valve chamber that is connected between the orifice and the pressurizing/depressurizing unit. The second valve body enables communication between the common valve chamber and a second valve chamber communicating with an inside of the canister. The third valve body enables communication between the common valve chamber and a third valve chamber communicating with an inside of the fuel tank.

According to the configuration of the present disclosure, the valve mechanism unit includes three valve bodies. The first valve body can switch between a communication state and a non-communication state of communication between the bypass path and the common valve chamber. The second valve body can switch between a communication state and a non-communication state of communication between the inside of the canister and the common valve chamber. The third valve body can switch between a communication state and a non-communication state of communication between the inside of the fuel tank and the common valve chamber. A part communicating with the common valve chamber, i.e., a mode of communication with the common valve chamber within the system is variable under open/close control of these three valve bodies by the control unit.

Accordingly, an internal pressure of the canister, an internal pressure of the fuel tank, a system entire pressure, and the like are detectable by the single pressure detection unit disposed in the common valve chamber. In this case, only the one pressure detection unit (e.g., pressure sensor) is required to perform fuel vapor leak inspection. This configuration therefore reduces the number of harnesses for connecting the pressure detection unit and the control unit with electrical continuity, and simplifies the device configuration in comparison with a configuration including a plurality of pressure detection units.

DETAILED DESCRIPTION

Embodiments of the present disclosure are hereinafter described with reference to the drawings.

First Embodiment

[Configuration]

Figure 1:
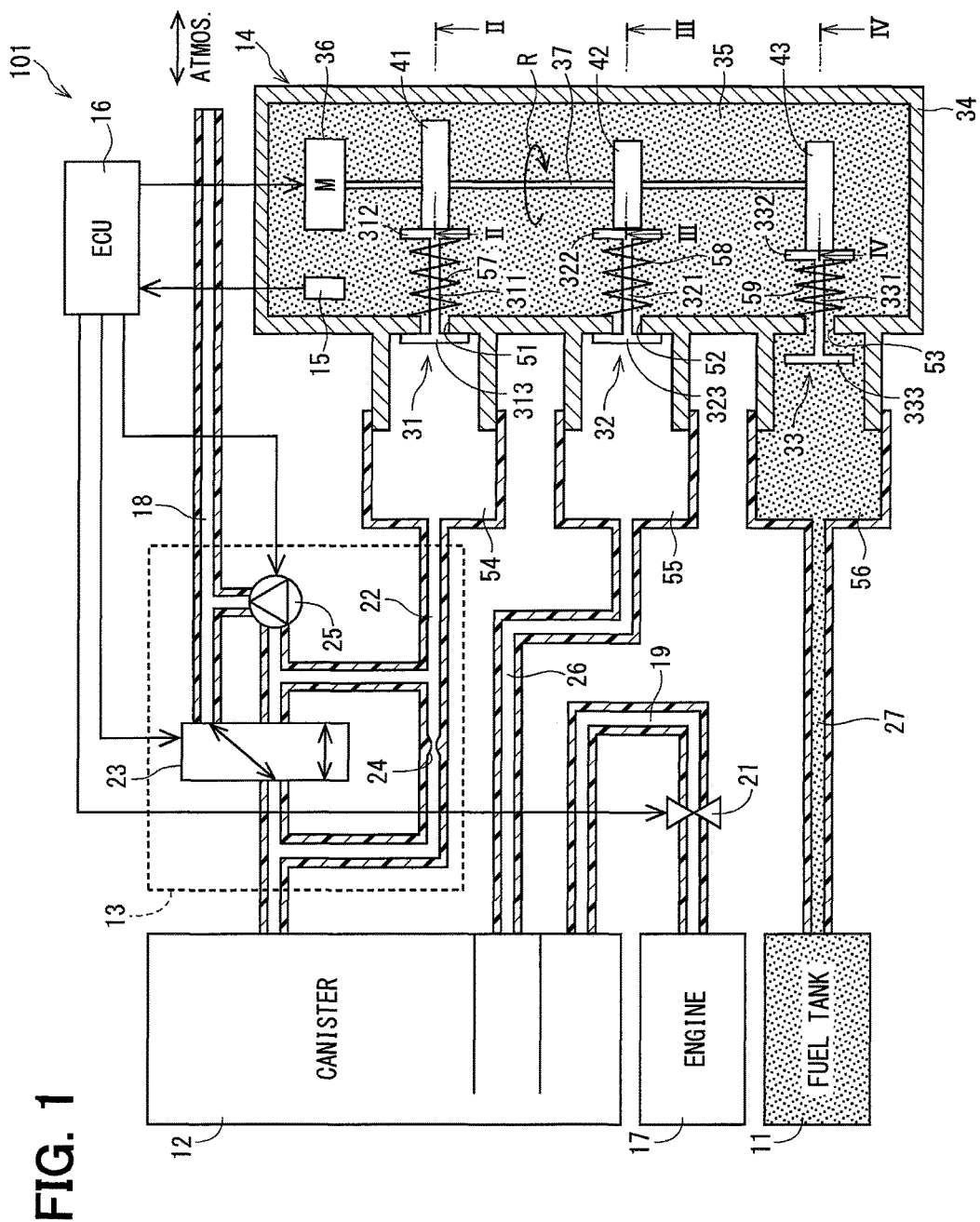
FIG. 1 is a diagram schematically illustrating a fuel vapor processing device according to a first embodiment, showing a state during tank pressure detection in pattern "A".

A configuration of a first embodiment of the present disclosure is now described with reference to FIGS. 1 to 5. As illustrated in FIG. 1, a fuel vapor processing device 101 according to the present embodiment includes a canister 12, a fuel vapor leak diagnosis module 13, a three-way valve 14, a pressure sensor 15, an ECU 16, a switching valve 23, a pump 25, and others.

A fuel tank 11 is mounted on a vehicle to store fuel to be supplied to an internal combustion engine 17. The canister 12 includes an absorbent (not shown) that recovers fuel vapor generated in the fuel tank 11. The canister 12 performs a purging process of conveying air, which has been introduced through an atmosphere path 18, to an intake path of the internal combustion engine 17 via a purge path 19 together with fuel vapor absorbed by the absorbent of the canister 12. The purge path 19 includes a purge valve 21. The quantity of the purged fuel vapor conveyed from the canister 12 to the intake path is controlled in accordance with an opening degree of the purge valve 21.

The fuel vapor leak diagnosis module 13 is constituted by the atmosphere path 18, a bypass path 22, the switching valve 23, an orifice 24, the pump 25, and others. The atmosphere path 18 communicatively connects the inside of the canister and the atmosphere. The switching valve 23 is disposed at an intermediate position of the atmosphere path 18 to switch between a state where the canister 12 is communicatively connected to the atmosphere, and a state where the canister 12 is isolated from the atmosphere. Accordingly, the switching valve 23 has a function of opening the canister 12 to the atmosphere, and of shielding the canister 12 from the atmosphere. More specifically, the switching valve 23 is an electromagnetic valve that operates in accordance with a switching signal transmitted from the ECU 16. In an off-state without energization, the switching valve 23 communicatively connects the canister 12 to the atmosphere. In an on-state with supply of a switching signal from the ECU 16, the switching valve 23 shields the canister 12 from the atmosphere.

The bypass path 22 is a path branching from the atmosphere path 18 to bypass the switching valve 23. The pump 25 and the orifice 24 are provided in the bypass path 22. The bypass path 22 includes a channel that extends from the canister toward the pump 25 via the orifice 24, and joins to the atmosphere path 18, and a channel that extends from the canister, passes through the orifice 24, and branches from the orifice 24 to reach the three-way valve 14. A canister connection path 26 connects the canister 12 and the three-way valve 14. A tank connection path 27 connects the fuel tank 11 and the three-way valve 14. The pump 25 corresponds to a pressurizing/depressurizing unit. The pump 25 has a function of discharging air, which is within inner spaces such as the canister 12, the fuel tank 11, the bypass path 22, and the connection paths 26 and 27, into the atmosphere. Thereby, a negative pressure is generated in a predetermined system with respect to the atmospheric pressure in accordance with valve open/close states of the switching valve 23 and the three-way valve 14.

The orifice 24 is used at the time of setting of a reference pressure corresponding to a criterion for determining presence of a leak at the time of leak diagnosis described below. The three-way valve 14 is configured by a first valve body 31, a second valve body 32, a third valve body 33, a housing 34, a common valve chamber 35, a motor 36, a camshaft 37, a first cam body 41, a second cam body 42, a third cam body 43 and others. The camshaft 37 is connected to the motor 36. The first cam body 41, the second cam body 42, and the third cam body 43 are provided on the camshaft 37 in this order from the motor side.

Figure 2:
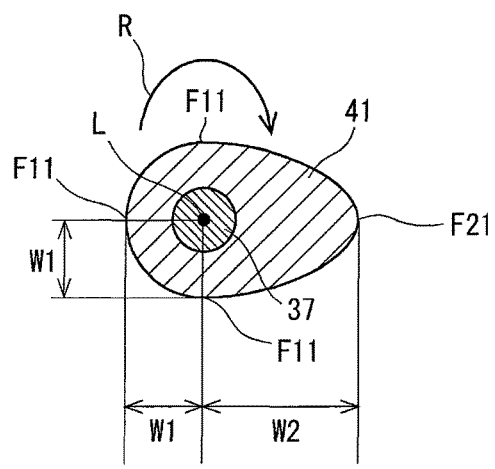
FIG. 2 is a cross-sectional view taken along a line II-II in FIG. 1, showing a first cam body.
Figure 3:
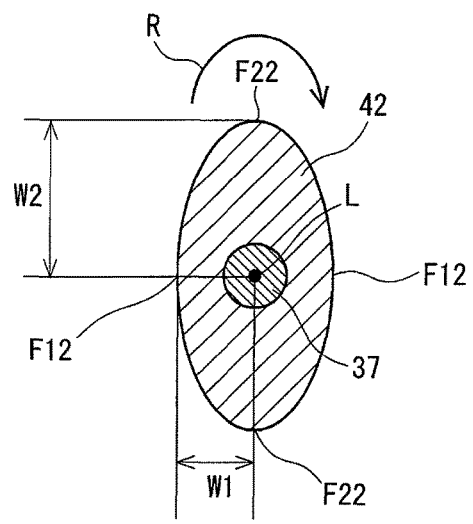
FIG. 3 is a cross-sectional view taken along a line III-III in FIG. 1, showing a second cam body.
Figure 4:
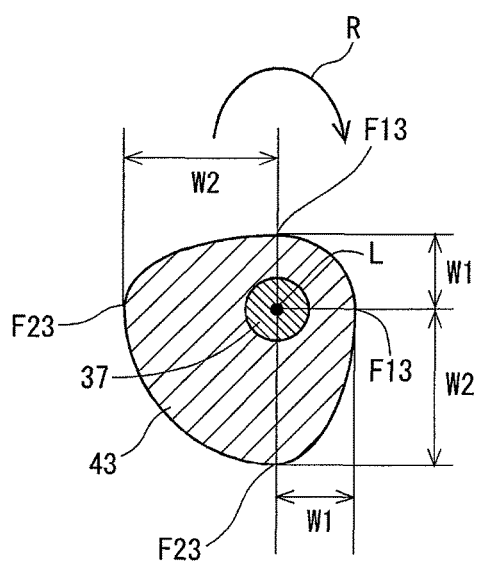
FIG. 4 is a cross-sectional view taken along a line IV-IV in FIG. 1, showing a third cam body.

FIGS. 2 to 4 illustrate cross-sectional shapes of the cam bodies 41, 42, and 43, respectively, in a plane crossing the camshaft 37 at right angles when the camshaft 37 has a rotation angle of zero degrees. FIGS. 2 to 4 illustrate only the respective cam bodies 41, 42 and 43, and do not show the housing 34 and lines which may be viewed behind the cam bodies 41, 42, and 43. The cam bodies 41, 42, and 43 configured by plate cams transmit power to the respective valve bodies 31, 32, and 33 via outer circumferences of the cam bodies 41, 42, and 43. As illustrated in FIG. 2, the first cam body 41 is an eccentric cam that has a substantially egg-shaped cross-sectional shape. As illustrated in FIG. 3, the second cam body 42 has an elliptical cross-sectional shape, and has a center fixed to the camshaft 37. As illustrated in FIG. 4, the third cam body 43 is an eccentric triangular cam eccentrically fixed to the camshaft 37.

The valve bodies 31, 32, and 33 respectively include shaft portions 311, 321, 331, ends 312, 322, and 332, and opposite ends 313, 323, and 333. The ends 312, 322, and 332, and the opposite ends 313, 323, and 333 have diameters larger than diameters of the shaft portions 311, 321, and 331. The ends 312, 322, and 332 are provided at the camshaft 37 side ends of the shaft portions 311, 321, and 331. The opposite ends 313, 323, and 333 are provided at the opposite side ends of the shaft portions 311, 321, and 331 on the sides opposite to the camshaft 37.

The end 312 of the first valve body 31 contacts the outer circumference of the first cam body 41. The end 322 of the second valve body 32 contacts the outer circumference of the second cam body 42. The end 332 of the third valve body 33 contacts the outer circumference of the third cam body 43. The cam bodies 41, 42, and 43 guide the valve bodies 31, 32, and 33 via outer circumferential surfaces of the cam bodies 41, 42, and 43. More specifically, contact points vary for every 90 degrees of rotation of the camshaft 37 through 360 degrees.

For example, at the time of contact between the first cam body 41 and the end 312 of the first valve body 31 at a contact point F11 located at a distance of W1 from a center L as illustrated in FIG. 2, the first valve body 31 is closed without a press toward a first valve chamber 54. At the time of contact between the first cam body 41 and the end 312 of the valve body 31 at a contact point F21 located at a distance W2 (>W1) from the center L, the first valve body 31 is opened by being pressed toward the first valve chamber 54. The first valve body 31 is opened only when the camshaft 37 has a rotation angle of 180 degrees.

As illustrated in FIGS. 3 and 4, the second cam body 42 and the third cam body 43 operate in a similar manner. At the time of contact at contact points F12 and F13 located at the distance W1 from the center L, each of the valve bodies 32 and 33 is closed. At the time of contact at contact points F22 and F23 located at the distance W2 (>W1) from the center L, each of the valve bodies 32 and 33 is opened. The second valve body 32 is opened when the camshaft 37 has rotation angles of 90 degrees and 270 degrees. The third valve body 33 is opened when the camshaft 37 has rotation angles of zero degrees and 90 degrees.

The common valve chamber 35 that houses the valve bodies 31, 32, and 33 is provided inside the housing 34. A first valve hole 51, a second valve hole 52, and a third valve hole 53 penetrate an opposite side wall face of the housing 34. The shaft portion 311 of the first valve body 31 is inserted into the first valve hole 51. The shaft portion 321 of the second valve body 32 is inserted into the second valve hole 52. The shaft portion 331 of the third valve body 33 is inserted into the third valve hole 53. The opposite ends 313, 323, and 333 of the respective valve bodies 31, 32, and 33 on the side opposite to the cam bodies 41 42, and 43 are located outside the valve holes 51, 52, and 53, i.e., outside the common valve chamber 35. Cross-sectional areas of the opposite ends 313, 323, and 333 of the respective valve bodies 31, 32, and 33 are larger than opening areas of the valve holes 51, 52, and 53 into which the opposite ends 313, 323, and 333 are inserted, so as to close the valve holes 51, 52, and 53 by the opposite ends 313, 323, and 333.

The opposite end 313 of the first valve body 31 is housed in the first valve chamber 54 communicating with the bypass path 22. The opposite end 323 of the second valve body 32 is housed in the second valve chamber 55. The second valve chamber 55 is provided at a three-way valve side end of the canister connection path 26. The opposite end 333 of the third valve body 33 is housed in the third valve chamber 56 communicating with the inside of the fuel tank 11. The third valve chamber 56 is provided at a three-way valve side end of the tank connection path 27.

The valve bodies 31, 32, and 33 are urged in such directions as to close the valve holes 51, 52, and 53 by springs 57, 58, and 59 provided around the shaft portions 311, 321, and 331. The opposite ends 313, 323, and 333 of the valve bodies 31, 32, and 33 open or close the valve holes 51, 52, and 53 in accordance with rotation of the camshaft 37. Accordingly, the three-way valve 14 of the present embodiment is configured to selectively press the three valve bodies 31, 32, and 33 in accordance with rotations of the three cam bodies 41, 42, and 43 having different shapes to switch the valve chambers 54, 55, and 56 allowed to communicate with the common valve chamber 35.

Figure 5:
FIG. 5 is a table showing open/close patterns of a three-way valve.

As shown in open/close pattern table T in FIG. 5, the three-way valve 14 according to the present embodiment has four open/close patterns selected for each 90 degrees of the rotation angle of the camshaft 37. In pattern "A", the camshaft 37 has a rotation angle of zero degrees, and the first valve body 31 and the second valve body 32 are closed, while the third valve body 33 is opened. In pattern "B", the camshaft 37 has a rotation angle of 90 degrees, and the first valve body 31 is closed, while the second valve body 32 and the third valve body 33 are opened. In pattern "C", the camshaft 37 has a rotation angle of 180 degrees, and the first valve body 31 is opened, while the second valve body 32 and the third valve body 33 are closed. In pattern "D", the camshaft 37 has a rotation angle of 270 degrees, and the first valve body 31 and the third valve body 33 are closed, while the second valve body 32 is opened.

Pattern "A" corresponds to a fuel tank pressure detection pattern, while pattern "B" corresponds to an entire pressure detection pattern. Pattern "C" corresponds to a first valve chamber communication pattern and a canister pressure detection pattern. Pattern "D" corresponds to a second valve chamber communication pattern and a canister pressure detection pattern.

While the camshaft 37 rotates in a direction indicated by a rotation direction R in FIG. 1 in the description herein, the camshaft 37 may be configured to be rotatable in the opposite direction. In this case, pattern "C" is directly switchable to pattern "B" without passing through states of pattern "D" and pattern "A" at the time of switching from pattern "C" to pattern "B", for example.

Description continues again with reference to FIG. 1. The single pressure sensor 15 corresponding to a pressure detection unit is provided inside the common valve chamber 35. The pressure sensor 15 may be configured by either a relative pressure sensor or an absolute pressure sensor. When the pressure sensor 15 is a relative pressure sensor, A/D conversion errors to be produced are more reduced than A/D conversion errors produced by an absolute pressure sensor. Accordingly, measurement accuracy increases. When the pressure sensor 15 is an absolute pressure sensor, a change of surrounding environment is detectable by atmospheric pressure measurement. Accordingly, such control of discarding a leak diagnosis result in accordance with a status of surrounding environment is performable.

The ECU 16 corresponding to a control unit is configured by a microcomputer or the like including not-shown central processing unit (CPU), random-access memory (RAM), read-only memory (ROM) and others. The ECU 16 electrically connects with the pressure sensor 15, the pump 25, the switching valve 23, the purge valve 21, and the three-way valve 14. The ECU 16 receives a signal responsive to a pressure detected by the pressure sensor 15. The ECU 16 outputs signals for controlling driving of the pump 25, the purge valve 21, the switching valve 23, and the motor 36 of the three-way valve 14.

FIG. 1 illustrates a sealed space communicating with the common valve chamber 35, which is indicated by dots. This sealed space is produced in such a condition that the pump 25 is not driven, and in pattern "A" set for the valve open/close state of the three-way valve 14. FIGS. 8 to 13 each illustrate a space communicating with the common valve chamber 35, which is indicated by dots. This space is defined when the system is decompressed by the pump 25.

(Main Control)

A fuel vapor leak diagnosis process executed by the ECU 16 of the fuel vapor processing device 101 is now described with reference to flowcharts shown in FIGS. 6 and 7. This diagnosis is achieved by decompression of the system. After an elapse of a predetermined period from a stop of operation of the internal combustion engine 17 mounted on the vehicle, the ECU 16 starts in response to a not-shown soak timer. During parking, the three-way valve 14 is set to pattern "A", while the switching valve 23 is set to the off-state as illustrated in FIG. 1. In this case, the fuel tank 11, the tank connection path 27, the third valve chamber 56, and the common valve chamber 35 communicate with each other. Accordingly, a detection pressure P detected in this state is considered to be equivalent to an internal pressure of the fuel tank 11. The internal pressure of the fuel tank 11 is hereinafter abbreviated as a fuel tank pressure.

Figure 6:
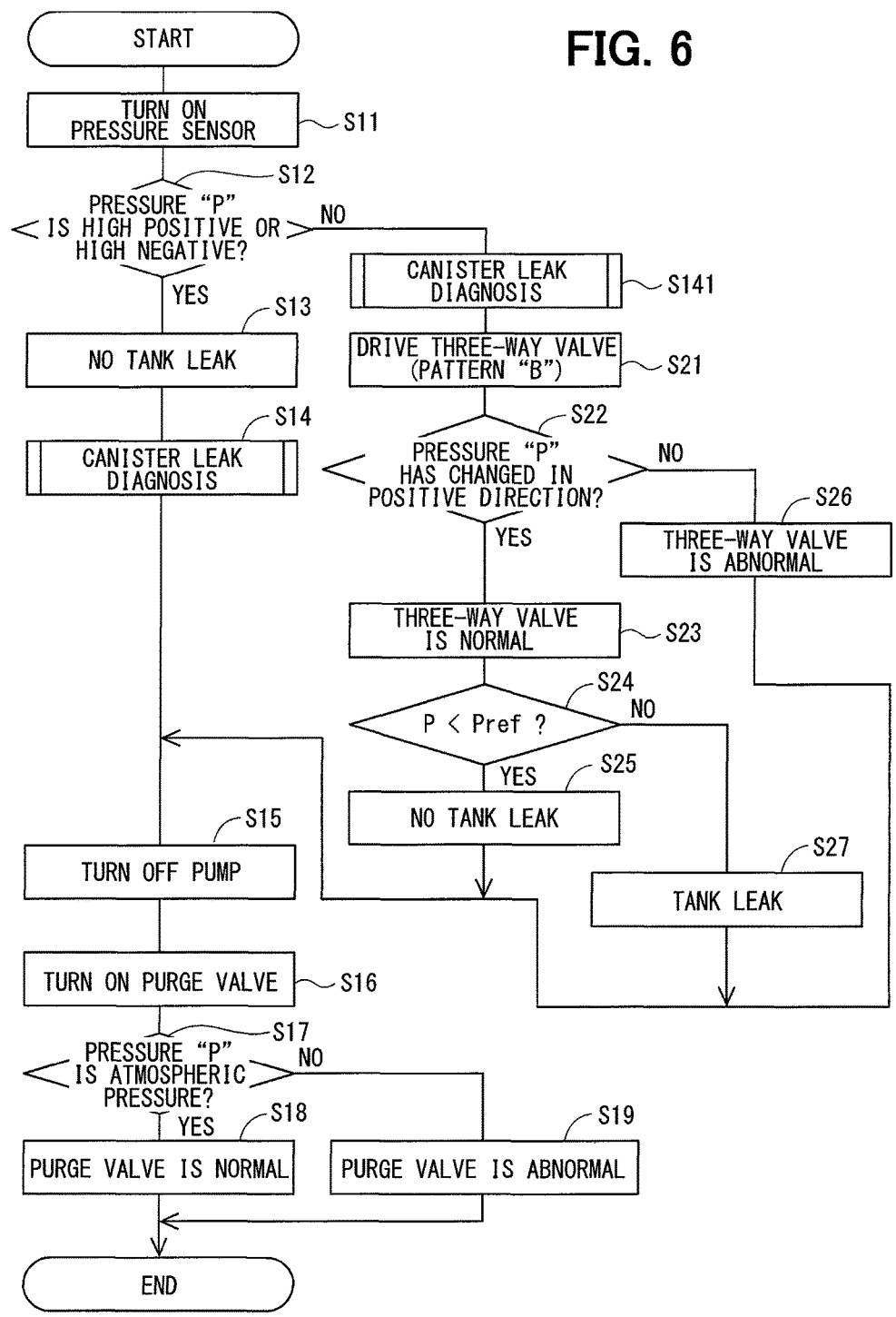
FIG. 6 is a main flowchart showing a flow of a diagnosis process executed by the fuel vapor processing device according to the first embodiment under depressurization of a system.

As shown in FIG. 6, the pressure sensor 15 is turned on to detect the fuel tank pressure in step (hereinafter abbreviated as "S") 11. In S12, it is subsequently determined whether the detected detection pressure P is either a high positive pressure or a high negative pressure set beforehand. When it is determined that the detection pressure P is the high positive pressure or the high negative pressure (S12: YES), the process proceeds to S13, where absence of a fuel vapor leak from the fuel tank 11, i.e., absence of a tank leak is determined. This determination is made based on a consideration that a leak from a closed system is absent when the detection pressure P corresponding to the fuel tank pressure in a normal atmospheric pressure state of the surrounding environment of the vehicle is the high positive pressure or the high negative pressure. After determination of absence of a tank leak, the process proceeds to canister leak diagnosis in S14.

When it is determined that the detected tank internal pressure is neither the high positive pressure nor the high negative pressure set beforehand in S12 (S12: NO), determination of a leak from the fuel tank 11 is temporarily suspended. The process subsequently proceeds to canister leak diagnosis in S141.

(Canister Leak Diagnosis)

Details of S14 and S141 in the canister leak diagnosis are described with reference to a flowchart in FIG. 7. In the canister leak diagnosis, opening and closing of the three-way valve 14 in pattern "C" is initially performed, while the pump 25 is turned on in S41. At this time, the fuel vapor processing device 101 is in a state illustrated in FIG. 8. In this state, the first valve chamber 54 and the common valve chamber 35 communicate with each other, and the switching valve 23 is turned off. With a start of driving of the pump 25, the atmosphere is introduced through the atmosphere path 18, the switching valve 23, and the bypass path 22.

Subsequently, it is determined whether the detection pressure P detected by the pressure sensor 15 has changed in a negative direction by an amount of greater than or equal to a threshold within a certain period of time from the start of pumping in S42. The air flow introduced into the bypass path 22 is contracted by the orifice 24. The pressure of the air thus decreases to a predetermined pressure, and then becomes constant. When it is determined that the detection pressure P has changed in the negative direction by an amount greater than or equal to the threshold (S42: YES), normality of the three-way valve 14 and the pump 25 is determined in S43. Subsequently, it is determined whether the detection pressure P falls within a standard in S44. When it is determined that the detection pressure P falls within the standard (S44: YES), the process proceeds to S45. In this step, the detection pressure P which has decreased to the predetermined pressure and become constant is stored as a reference pressure Pref.

After detection of the reference pressure Pref, the switching valve 23 is turned on in S46. The switching valve 23 thus shields the canister 12 from the atmosphere path 18. At this time, the fuel vapor processing device 101 is in a state illustrated in FIG. 9, where the canister 12, the bypass path 22, the first valve chamber 54, and the common valve chamber 35 communicate with each other. The detection pressure P detected in this state is therefore considered to be equivalent to an internal pressure of the canister 12. The internal pressure of the canister 12 is hereinafter abbreviated as a canister pressure.

The three-way valve 14 at this time may be operated in pattern "D". In pattern "D", the fuel vapor processing device 101 is in a state illustrated in FIG. 10, where the canister 12, the canister connection path 26, the second valve chamber 55, and the common valve chamber 35 communicate with each other. Accordingly, the detection pressure P detected in this state is also considered to be equivalent to the canister pressure.

Description continues again with reference to FIG. 7. It is subsequently determined whether the detection pressure P has changed in a positive direction by an amount greater than or equal to a threshold within a certain period of time in S47. When it is determined that the detection pressure P has changed in the positive direction by an amount greater than or equal to the threshold (S47: YES), normality of the switching valve 23 is determined in S48.

Thereafter, it is determined whether the detection pressure P is lower than the reference pressure Pref in S49. When it is determined that the detection pressure P is lower than the reference pressure Pref (S49: YES), absence of a canister leak is determined in S50. The canister pressure lower than the reference pressure Pref as a result of continuation of operation of the pump 25 can be produced by a state that air does not enter the inside of the canister 12 from the outside, or a state that a leak hole allowing entrance of air is an extremely small hole smaller than the orifice 24 in size. It is therefore determined that sufficient airtightness of the canister 12 has been secured. As described above, the detection pressure P indicating the canister pressure is compared with the reference pressure Pref in S49, and a fuel vapor leak from the canister 12 is diagnosed in S50 based on a comparison result thus obtained.

After determination of absence of a canister leak, the process shifts to S15 or S21 in the main flow shown in FIG. 6.

When it is determined that a change of the detection pressure P in the negative direction by an amount greater than or equal to the threshold has not been produced in S42 (S42: NO), abnormality of the three-way valve 14, or abnormality of the pump 25 is determined in S51. For example, abnormality of the three-way valve 14, the switching valve 23, and the pump 25 refers to a state that normal switching or operation is difficult due to a sticking state, contamination, or for other reasons. When it is determined that the detection pressure P does not fall within the standard in S44 (S44: NO), abnormality of the pump 25, or abnormality of the orifice 24 is determined in S52. When it is determined that a change of the detection pressure P in the positive direction by an amount greater than or equal to the threshold has not been produced in S47 (S47: NO), abnormality of the switching valve 23 is determined in S53.

When it is determined that the detection pressure P is not lower than the reference pressure Pref in S49 (S49: NO), presence of a canister leak is determined in S54. When the pressure inside the canister 12 does not decrease to the reference pressure, it is considered that air is entering the canister 12 from the outside in accordance with depressurization of the inside of the canister 12. It is therefore determined that sufficient airtightness of the canister 12 is not secured in the presence of a large hole having an inside diameter larger than an inside diameter of the orifice 24.

After determinations in S51, S52, S53, and S54, the process shifts to S15 in the main flow shown in FIG. 6.

A process performed after the canister leak diagnosis is now described again with reference to FIG. 6. After execution of the canister leak diagnosis in S14 based on the determination of absence of a tank leak in S13, i.e., after completion of determination of airtightness of the tank and the canister 12, driving of the pump 25 is turned off in S15. Subsequently, the purge valve 21 is turned on in S16. It is subsequently determined whether the detection pressure P has reached the atmospheric pressure in S17. When it is determined that the detection pressure P has recovered to the atmospheric pressure (S17: YES), normality of the purge valve 21 is determined in S18. Thereafter, the process ends. When it is determined that recovery of the detection pressure P to the atmospheric pressure has not been achieved in S17 (S17: NO), the process proceeds to S19 to determine that the purge valve 21 is in a state of abnormality. It is estimated that the abnormality herein is caused by sticking of the purge valve 21 in the closed state.

When only determination of a canister leak is made in S141 under suspension of determination of a tank leak, opening and closing of the three-way valve 14 in pattern "B" is subsequently performed in S21. At this time, the fuel vapor processing device 101 is in a state illustrated in FIG. 11, where the canister 12, the canister connection path 26, the second valve chamber 55, the common valve chamber 35, the third valve chamber 56, the tank connection path 27, and the fuel tank 11 communicate with each other. In this case, the switching valve 23 is turned on after completion of the canister leak diagnosis (S46 in FIG. 7). Accordingly, the detection pressure P detected by the pressure sensor 15 in this state is considered to be equivalent to a system entire pressure.

It is subsequently determined whether the detection pressure P has changed in the positive direction by an amount greater than or equal to the threshold within a certain period of time in S22. When it is determined that the detection pressure P has changed in the positive direction by an amount greater than or equal to the threshold (S22: YES), normality of the three-way valve 14 is determined in S23. It is subsequently determined whether the detection pressure P is lower than the reference pressure Pref in S24. When it is determined that the detection pressure P is lower than the reference pressure Pref (S24: YES), absence of a tank leak is determined in S25.

In S21 to S24, therefore, the system entire pressure has been detected to determine presence or absence of a leak from the entire system including the canister 12 and the fuel tank 11. Absence of a leak from the canister 12 has been already determined in S141, and therefore determination of absence of a leak of the fuel tank 11 can be made. As described above, the detection pressure P indicating the entire pressure is compared with the reference pressure Pref in S24, and a fuel vapor leak from the fuel tank 11 is diagnosed based on a comparison result thus obtained in S25.

When it is determined that a change of the detection pressure P in the positive direction by an amount greater than or equal to the threshold has not been produced in S22 (S22: NO), the process proceeds to S26. In this step, abnormality of the three-way valve 14 is determined, and the process proceeds to S15. When it is determined that the detection pressure P is not lower than the reference pressure Pref in S24 (S24: NO), the process proceeds to S27. In this step, presence of a tank leak is determined, and the process then proceeds to S15.

Figure 12:
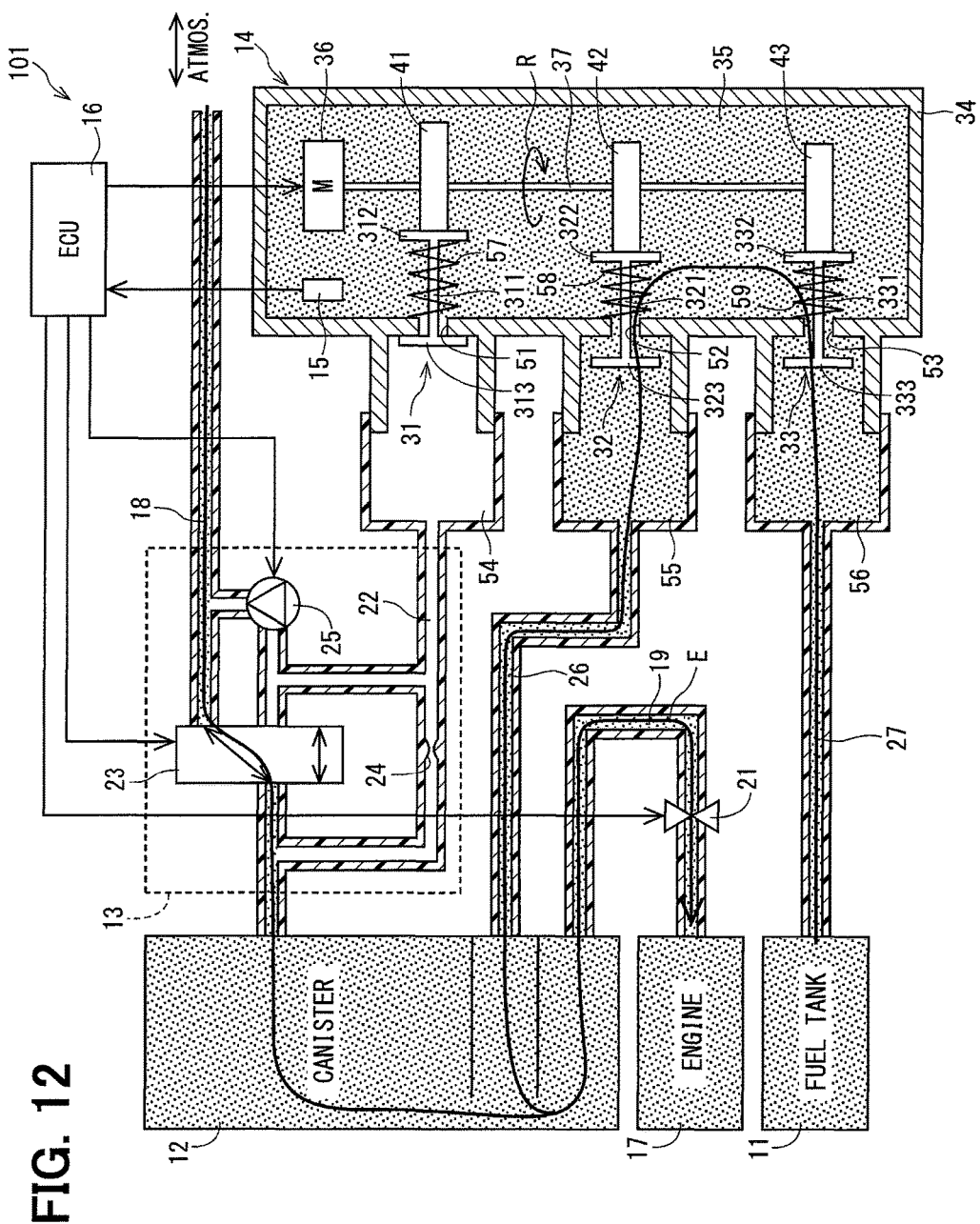
FIG. 12 is a diagram schematically illustrating the fuel vapor processing device according to the first embodiment, showing a state during traveling in pattern "B".

According to the fuel vapor processing device 101 detailed above, the three-way valve 14 is set to pattern "A" to seal the fuel tank 11 during parking as illustrated in FIG. 1. During traveling, the three-way valve 14 is set to pattern "B" with the purge valve 21 opened to purge fuel vapor during traveling as illustrated in FIG. 12. An arrow E in FIG. 12 indicates an air flow from the atmosphere. The internal combustion engine 17 is driven with introduction of the atmosphere from the atmosphere path 18, whereby a negative pressure is generated. As a result, fuel vapor is conveyed from the canister 12 toward the internal combustion engine 17 via the purge path 19.

Figure 13:
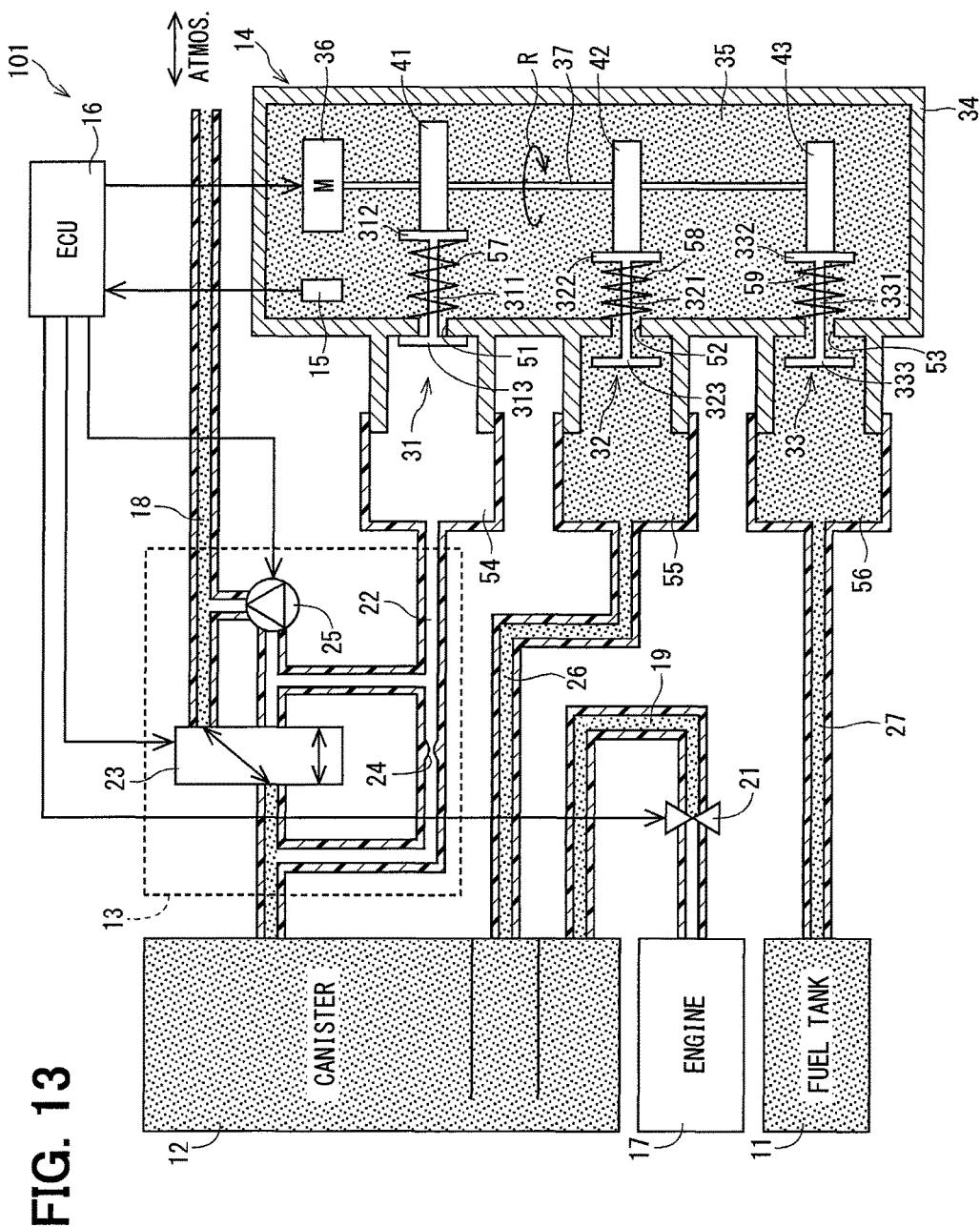
FIG. 13 is a diagram schematically illustrating the fuel vapor processing device according to the first embodiment, showing a state during refueling in pattern "B".

During refueling, the three-way valve 14 is set to pattern "B" with the purge valve 21 closed as illustrated in FIG. 13 to communicatively connect the fuel tank 11 to the atmosphere. In this condition, tank pressure release during refueling is achievable.

Figure 14:
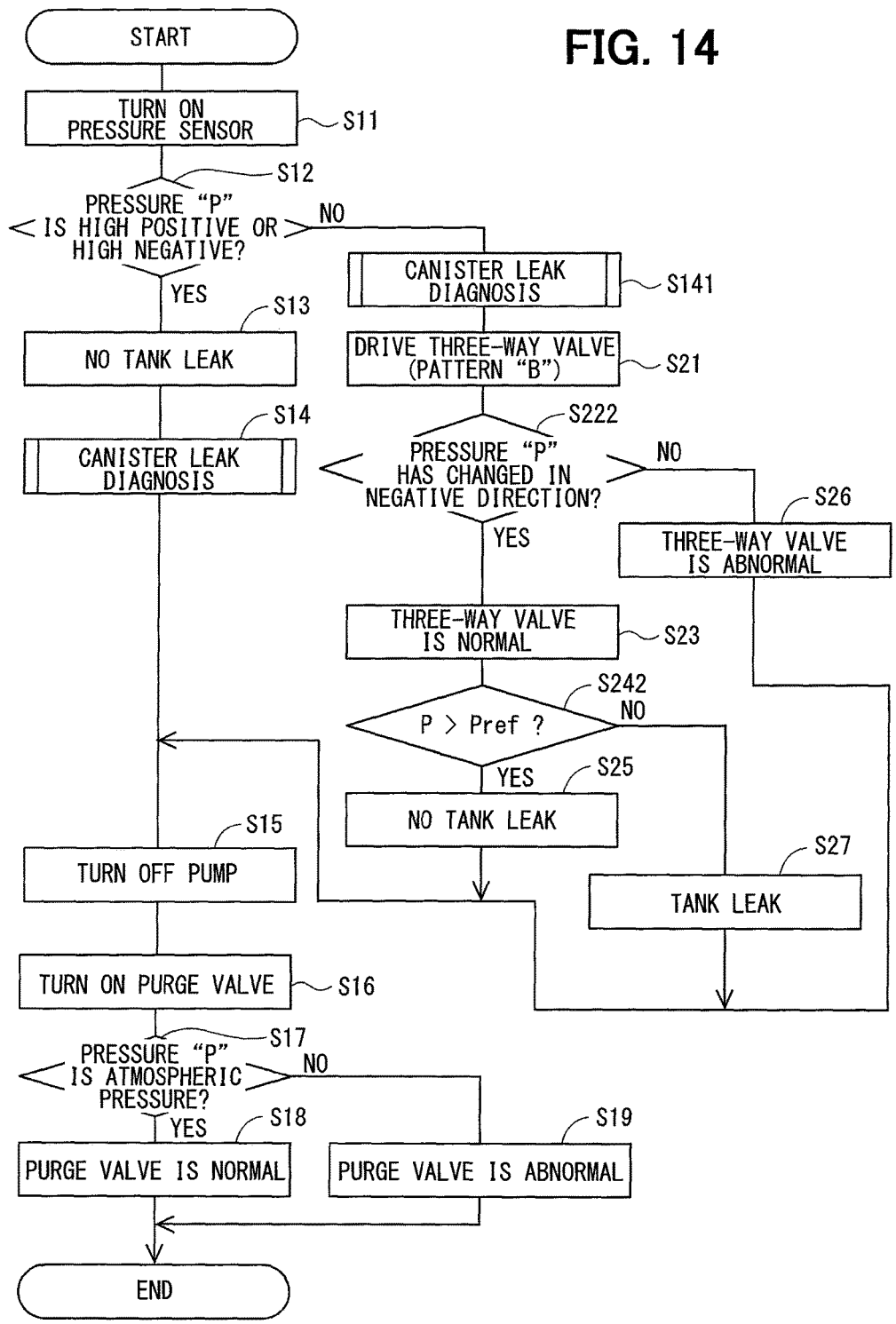
FIG. 14 is a main flowchart showing a flow of a diagnosis process executed by the fuel vapor processing device according to the first embodiment under pressurization of the system.
Figure 15:
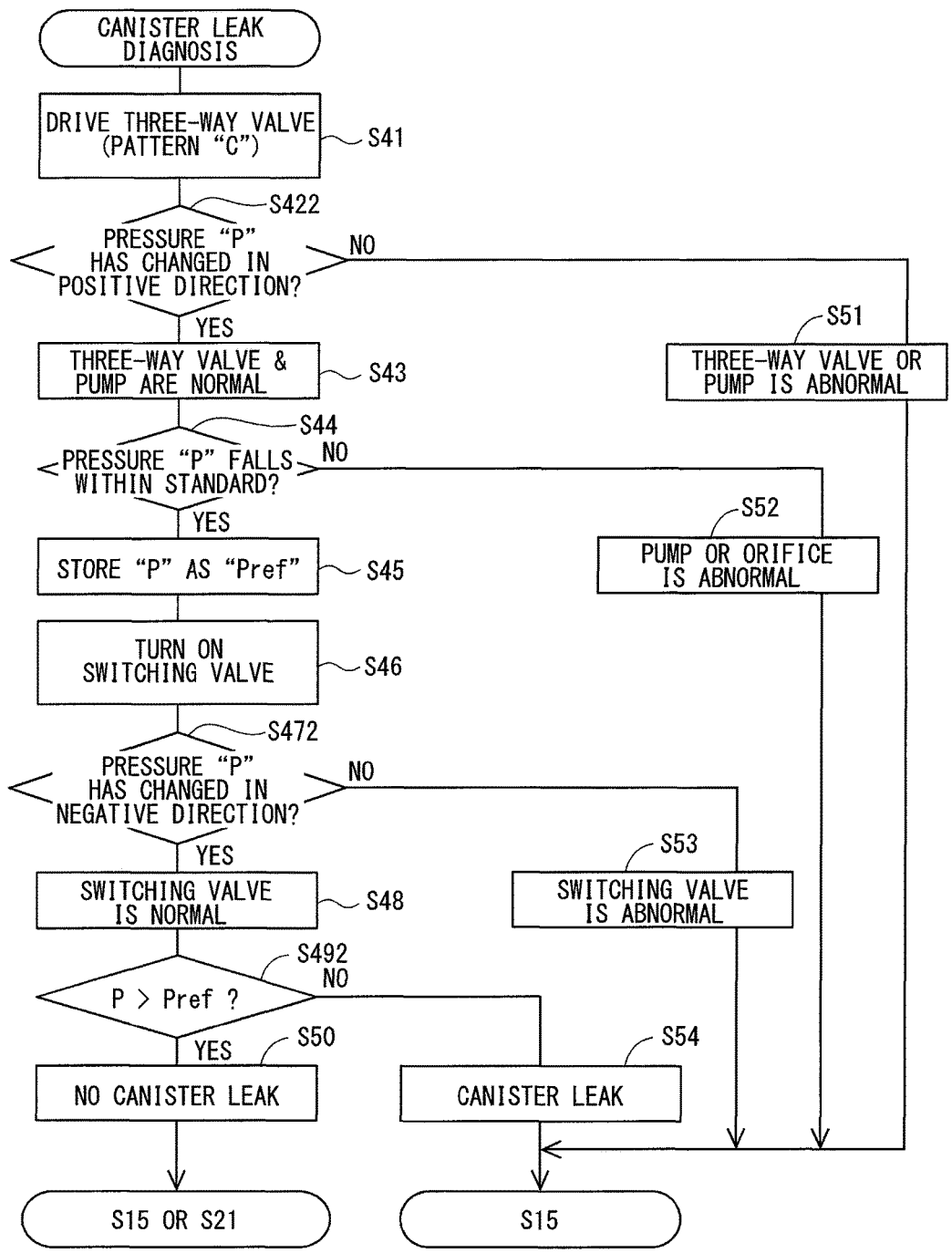
FIG. 15 is a flowchart showing a flow of a canister leak diagnosis process executed by the fuel vapor processing device according to the first embodiment under pressurization of the system.

While the fuel vapor leak diagnosis described above is performed by depressurizing the system, the fuel vapor leak diagnosis may be achieved by pressurizing the system. FIGS. 14 and 15 show a flowchart of this case. Steps substantially similar to the steps shown in FIGS. 6 and 7 are given identical reference numbers. Only different steps are touched upon herein, and repeated description of details is omitted. As shown in FIG. 14, it is determined whether the detection pressure P has changed in the negative direction by an amount greater than or equal to the threshold within a certain period of time in S222 instead of S22 in FIG. 6. In addition, it is determined whether the detection pressure P is higher than the reference pressure Pref in S242 instead of S24 in FIG. 6.

Figure 7:
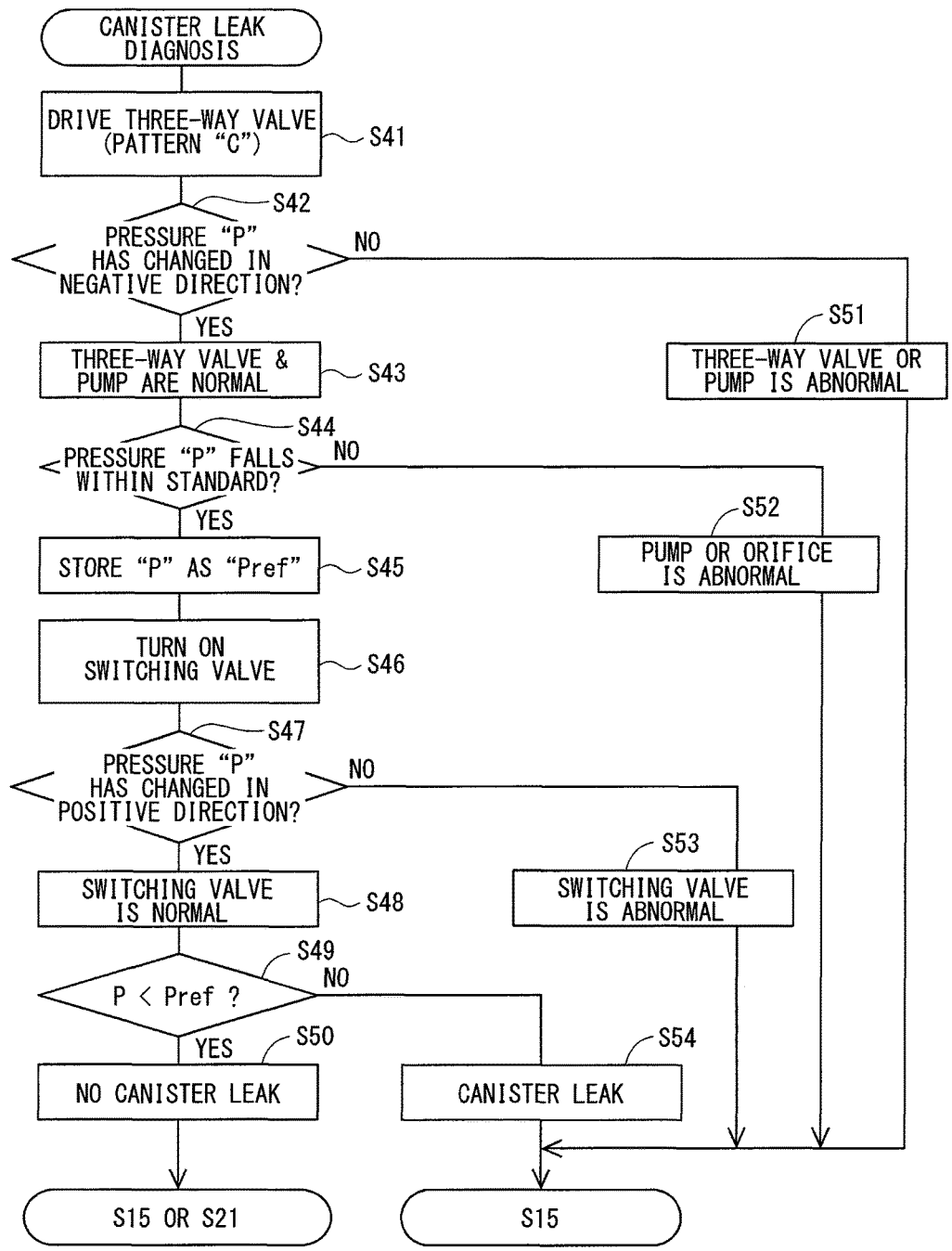
FIG. 7 is a flowchart showing a flow of a canister leak diagnosis process executed by the fuel vapor processing device according to the first embodiment with depressurization of the system.
Figure 8:
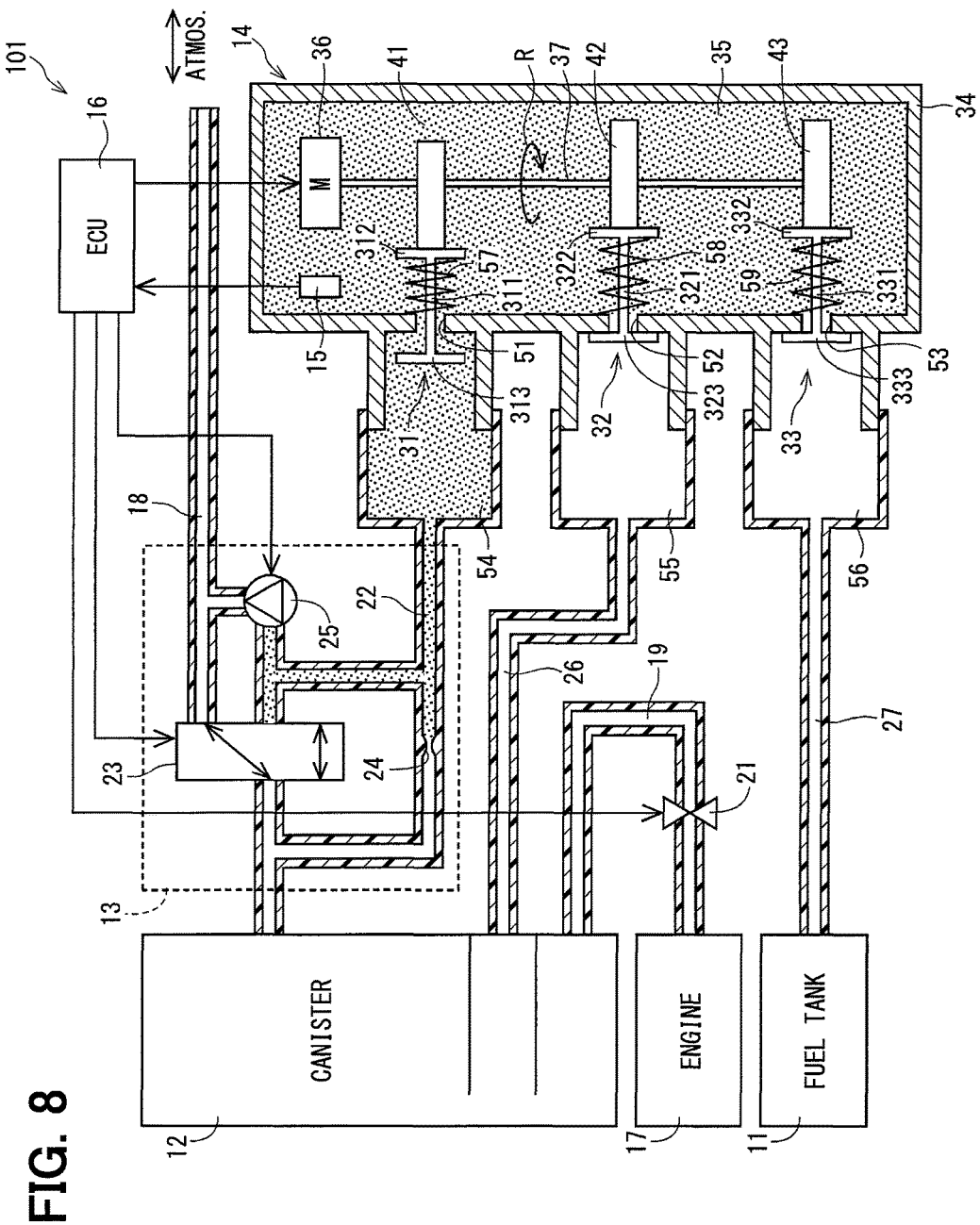
FIG. 8 is a diagram schematically illustrating the fuel vapor processing device according to the first embodiment, showing a state during reference pressure detection in pattern "C".
Figure 9:
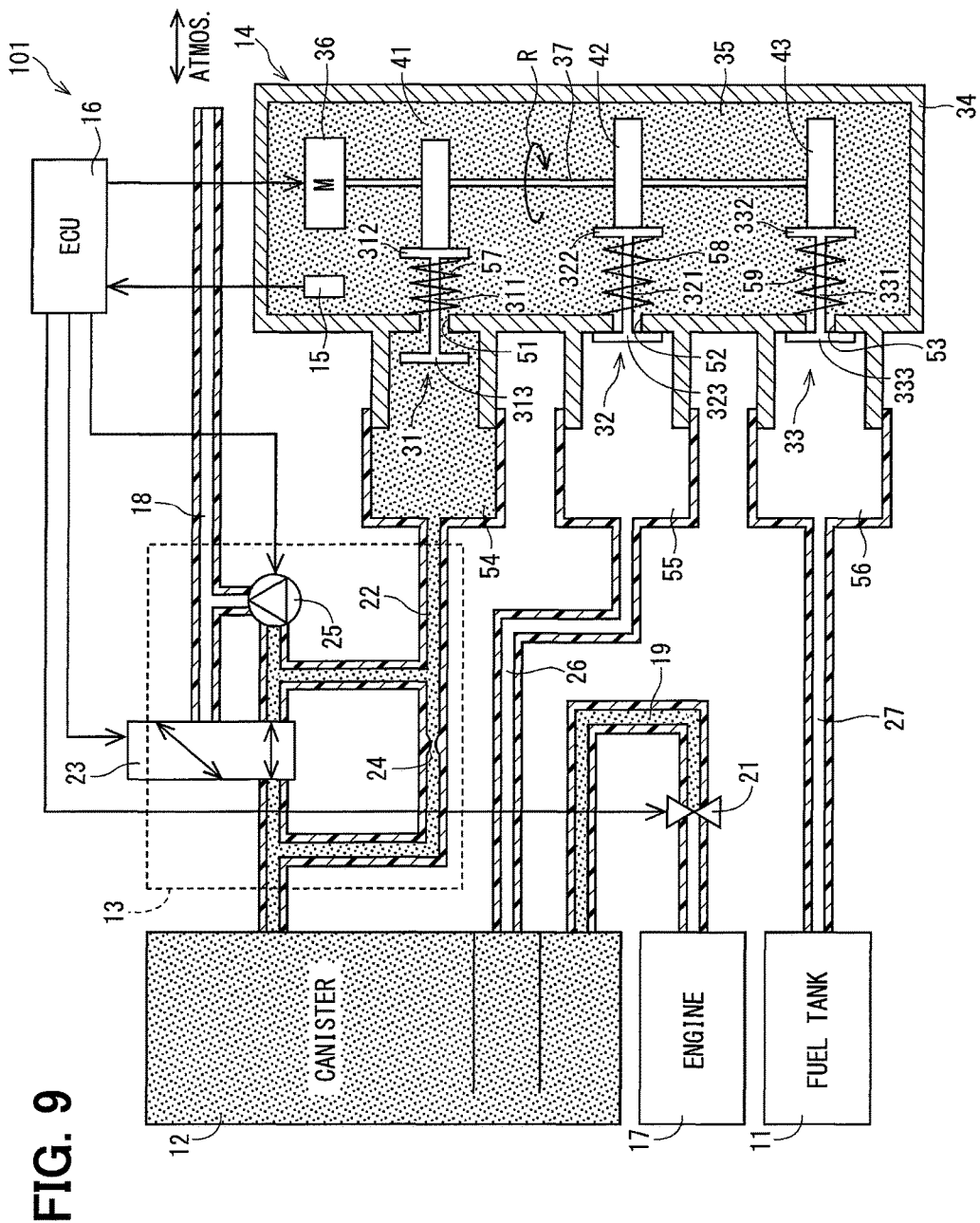
FIG. 9 is a diagram schematically illustrating the fuel vapor processing device according to the first embodiment, showing a state during canister pressure detection in pattern "C".
Figure 10:
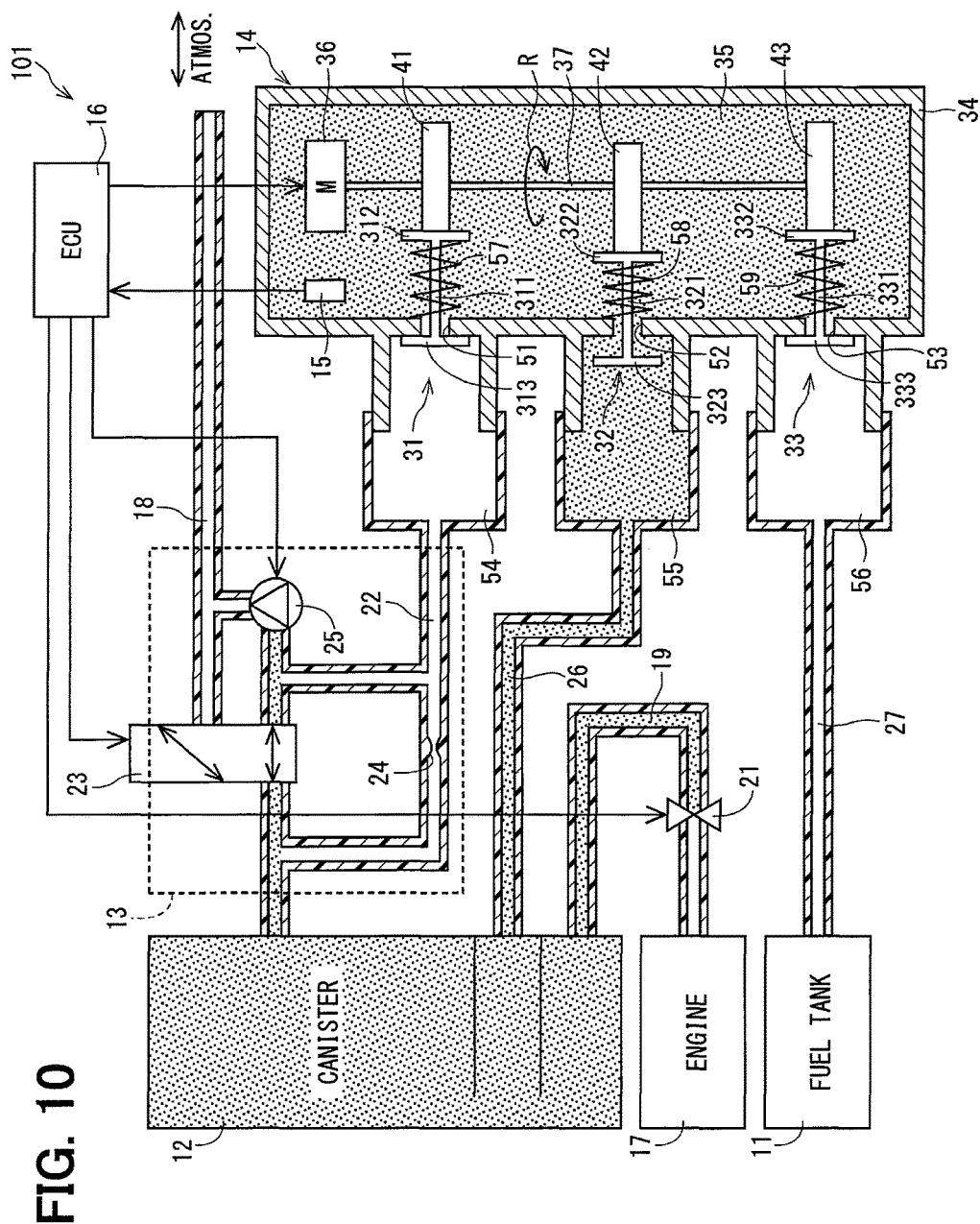
FIG. 10 is a diagram schematically illustrating the fuel vapor processing device according to the first embodiment, showing a state during canister pressure detection in pattern "D".
Figure 11:
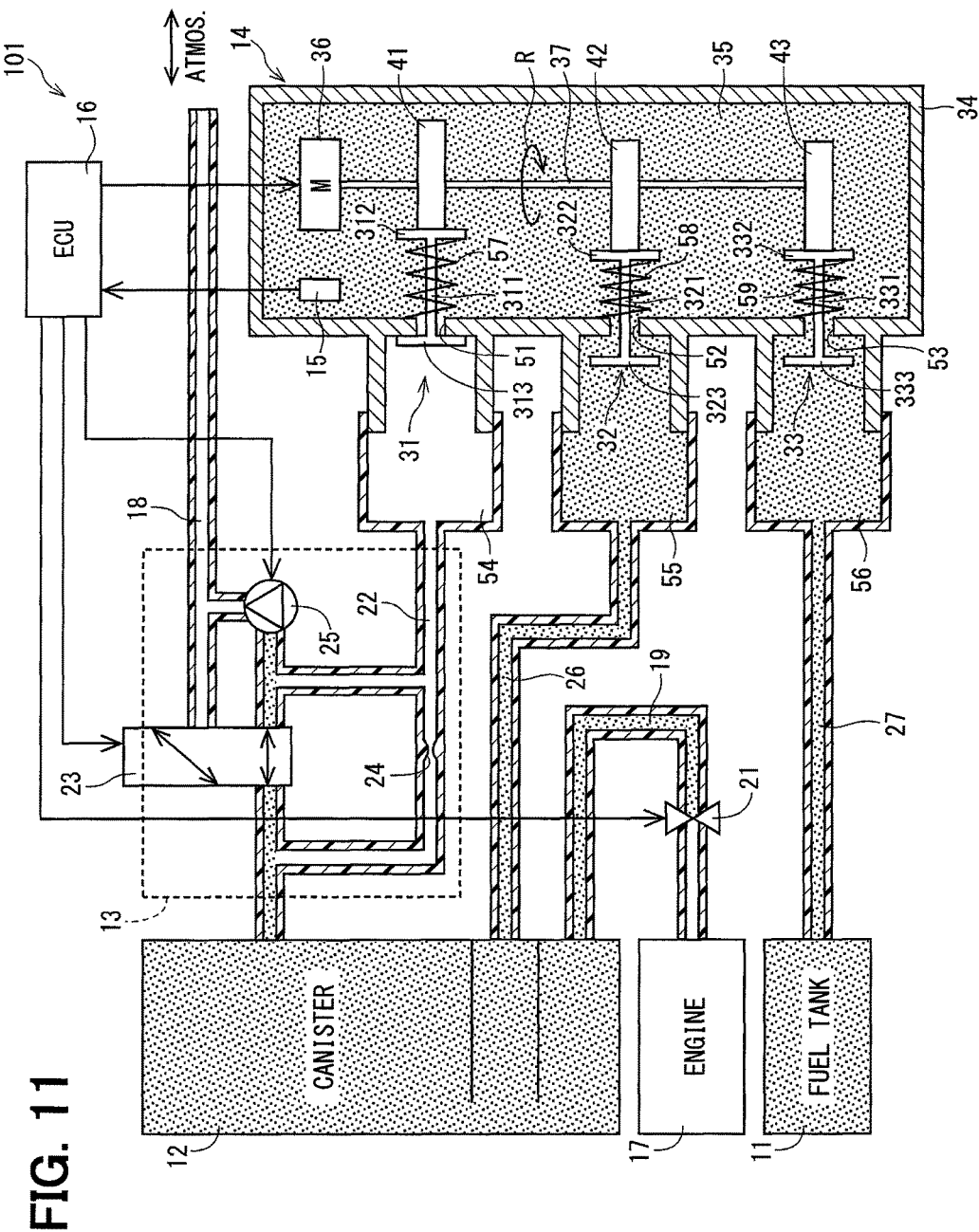
FIG. 11 is a diagram schematically illustrating the fuel vapor processing device according to the first embodiment, showing a state during system entire pressure detection in pattern "B".

As shown in FIG. 15, it is determined whether the detection pressure P detected by the pressure sensor 15 has changed in the positive direction by an amount greater than or equal to the threshold within a certain period of time after the start of pumping in S422 instead of S42 in FIG. 7. In addition, it is determined whether the detection pressure P has changed in the negative direction by an amount greater than or equal to the threshold within a certain period of time in S472 instead of S47 in FIG. 7. It is further determined whether the detection pressure P is higher than the reference pressure Pref in S492 instead of S49 in FIG. 7.

Advantageous Effects

According to the configuration of the first embodiment described above, the single pressure sensor 15 is provided in the common valve chamber 35 of the three-way valve 14. A tank pressure, a canister pressure, and a system entire pressure are detected by open/close switching of the valve bodies 31, 32, and 33 included in the three-way valve 14 to perform leak diagnosis. In this case, the device configuration is more simplified than a conventional configuration in which a fuel tank internal pressure sensor and a canister internal pressure sensor are separately provided, for example. Accordingly, a harness connecting with the ECU 16 is not required, for example.

Moreover, the configuration requiring only the single pressure sensor 15 achieves cost reduction more than a configuration including a plurality of the pressure sensors 15.

Furthermore, the structure having an operation mechanism of the three-way valve 14 operated by actions of the cam bodies 41, 42, and 43 in linkage with rotation of the camshaft 37 achieves size reduction of the device.

The three-way valve 14 according to the first embodiment described above has four open/close patterns "A" to "D" selected in accordance with a rotation angle of the camshaft 37. In this case, the fuel tank 11 can be sealed by selecting pattern "A" during parking, for example. During traveling, a conventional purging process can be achieved by designating pattern "B" as the open/close pattern with the purge valve 21 opened. During refueling, pressure release of the fuel tank 11 can be achieved by designating pattern "B" as the open/close pattern with the purge valve 21 closed, and the canister 12 communicatively connected to the atmosphere.

Second Embodiment

Figure 16:
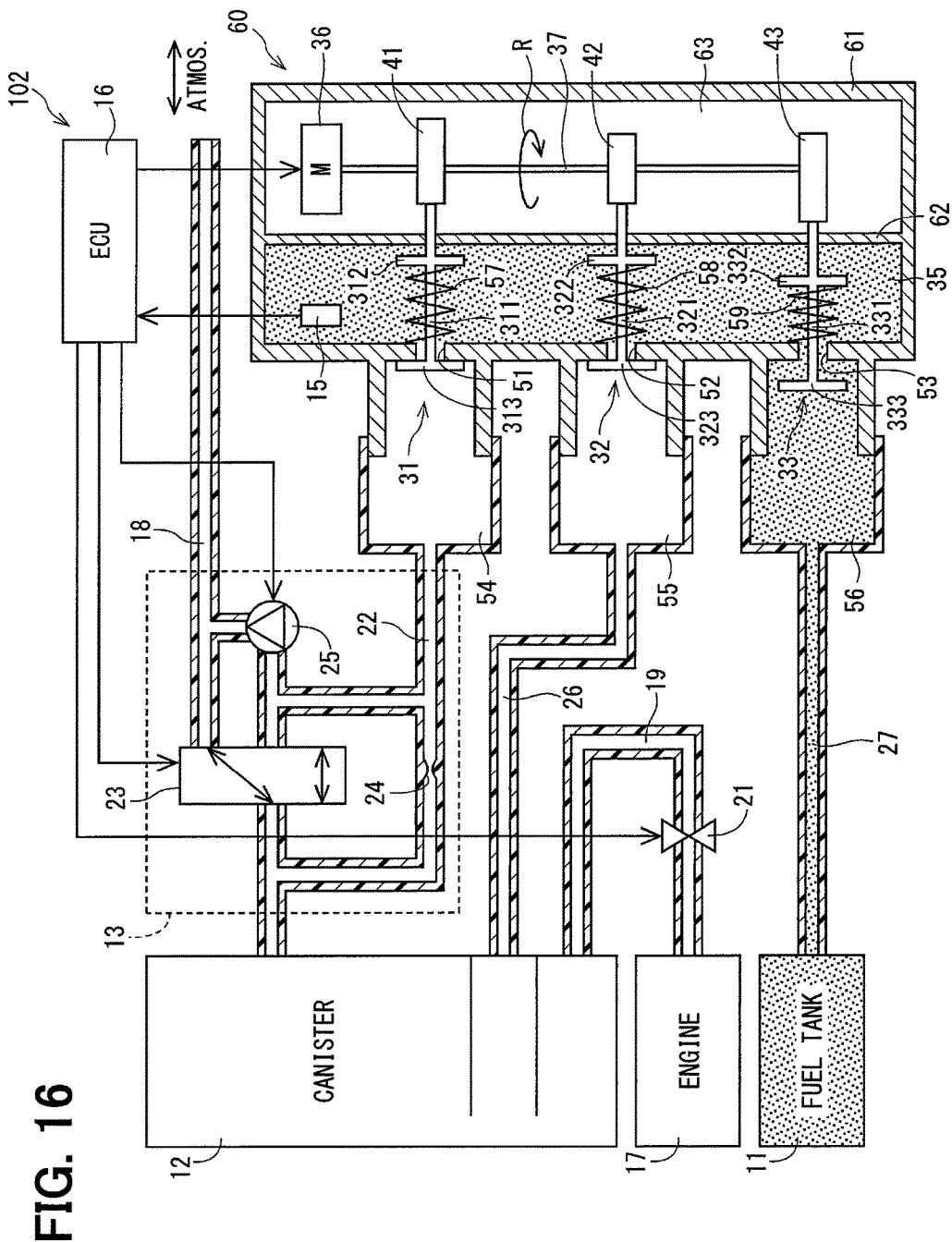
FIG. 16 is a diagram schematically illustrating a fuel vapor processing device according to a second embodiment, showing a state during tank pressure detection in pattern "A".

A fuel vapor processing device 102 according to a second embodiment of the present disclosure is now described with reference to FIG. 16. Configurations similar to the corresponding configurations in the first embodiment are given similar reference numbers, and the same description is not repeated. The second embodiment is different from the first embodiment in the configuration of the housing of the three-way valve. As illustrated in FIG. 16, a separation wall 62 is provided inside a housing 61 of a three-way valve 60 according to the present embodiment. The separation wall 62 separates the inside of the housing 61 into the common valve chamber 35 and a camshaft housing chamber 63. The camshaft housing chamber 63 houses the motor 36 and the cam bodies 41, 42, and 43 as well as the camshaft 37.

According to the present embodiment, fuel vapor flows into only the common valve chamber 35, and does not flow into the camshaft housing chamber 63 corresponding to a driving unit. This separation into the fuel vapor entering portion and the driving unit constitutes a configuration capable of preventing contact between fuel vapor and electronic devices such as the motor 36.

Third Embodiment

Figure 17:
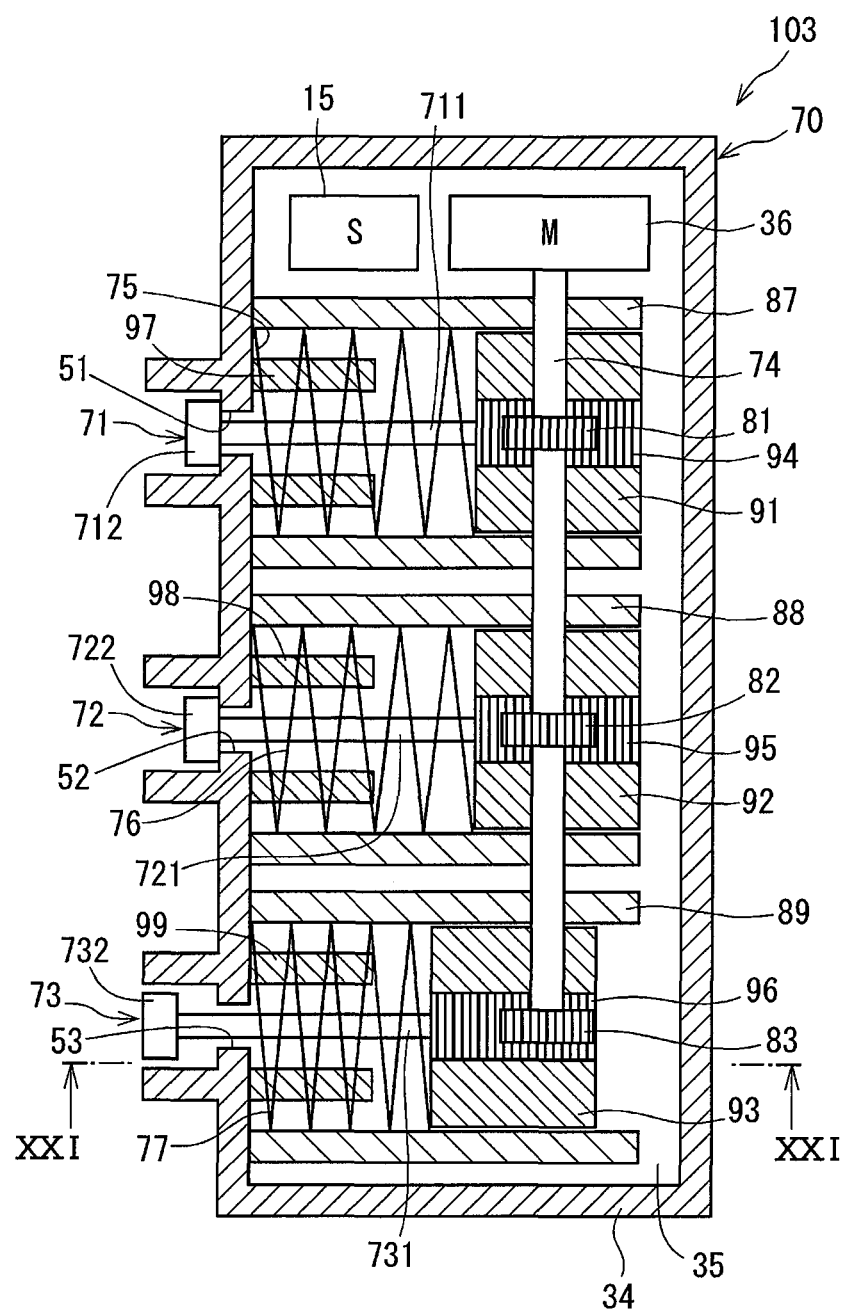
FIG. 17 is a cross-sectional view schematically illustrating a fuel vapor processing device according to a third embodiment, schematically showing particularly a three-way valve.

A fuel vapor processing device 103 according to a third embodiment of the present disclosure is now described with reference to FIGS. 17 to 21. Configurations similar to the corresponding configurations in the first embodiment are given similar reference numbers, and the same description is not repeated. The present embodiment is different from the first and second embodiments described above only in the operation mechanism of the three-way valve, and thus only a three-way valve 70 is illustrated in FIG. 17. The operation mechanism of the three-way valve 70 in the present embodiment is configured by a rack-and-pinion.

As illustrated in FIG. 17, the three-way valve 70 is configured by the housing 34, the common valve chamber 35, the motor 36, a first valve body 71, a second valve body 72, a third valve body 73, a rotation shaft 74, a first pinion 81, a second pinion 82, a third pinion 83, a first rack 91, a second rack 92, a third rack 93, springs 75, 76, and 77, and others. FIG. 17 illustrates such a state that the first valve body 71 and the second valve body 72 are closed, and that the third valve body 73 is opened.

Figure 21:
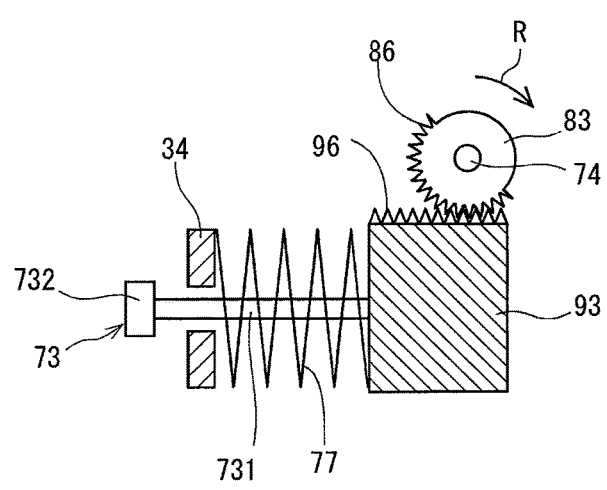
FIG. 21 is a cross-sectional view taken along a line XXI-XXI in FIG. 17.

The rotation shaft 74 is connected to the motor 36. The first pinion 81, the second pinion 82, and the third pinion 83 are provided on the rotation shaft 74 in this order from the motor side, and are rotatable around the rotation shaft 74. For example, the pinion 83 is rotatable in a rotation direction R in accordance with rotation of the rotation shaft 74, as illustrated in FIG. 21. FIG. 21 illustrates only the housing 34, the valve body 73, the spring 77, the rack 93, and the pinion 83, and does not show lines which may be viewed behind the cross section in the figure.

Figure 18:
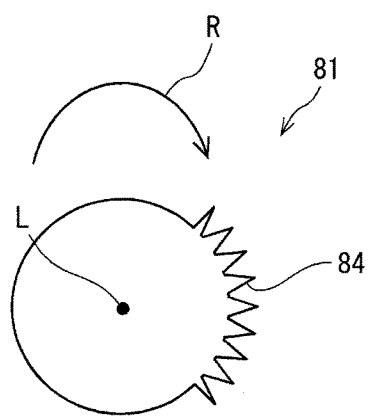
FIG. 18 is a diagram illustrating a first gear viewed in an axial direction of a rotation shaft.
Figure 19:
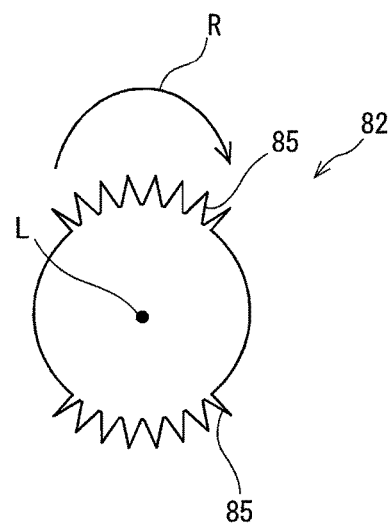
FIG. 19 is a diagram illustrating a second gear viewed in the axial direction of the rotation shaft.
Figure 20:
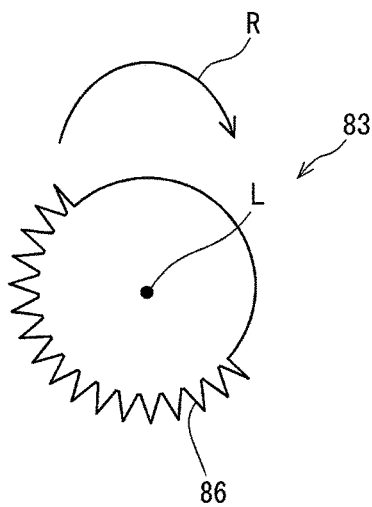
FIG. 20 is a diagram illustrating a third gear viewed in the axial direction of the rotation shaft.

FIGS. 18 to 20 illustrate the pinions 81, 82, and 83, respectively, as viewed in the axial direction in a state that the rotation shaft 74 has a rotation angle of zero degrees. As illustrated in FIG. 18, a gear 84 is formed at approximately one fourth of an outer circumference of the first pinion 81, i.e., at an outer circumference of a sector having a central angle of approximately 90 degrees. As illustrated in FIG. 19, gears 85 are formed at two positions of an outer circumference of the second pinion 82. Each of the gears 85 corresponds to a sector having a central angle of approximately 90 degrees similar to the sector of the first pinion 81. The two gears 85 are point-symmetrically disposed with respect to a center L. As illustrated in FIG. 20, a gear 86 is provided at approximately the half of an outer circumference of the third pinion 83.

Description continues again with reference to FIG. 17. Gears 94, 95, and 96 engageable with the gears 84, 85, and 86 of the pinions 81, 82, and 83 are provided on the racks 91, 92, and 93, respectively. Support walls 87, 88, and 89 are provided in the housing 34 in such positions as to surround both ends of the racks 91, 92, and 93, respectively. Stopper walls 97, 98, and 99 projecting from both sides of the valve holes 51, 52, and 53 toward the racks 91, 92, and 93 are further provided in the housing 34 to prevent collision with the racks 91, 92, and 93.

The valve bodies 71, 72, and 73 respectively include shaft portions 711, 721, and 731, and opposite ends 712, 722, and 732. The shaft portions 711, 721, and 731 are respectively inserted into the valve holes 51, 52, and 53. The opposite ends 712, 722, and 732 are larger in diameter than the shaft portions 711, 721, and 731, and are disposed outside the common valve chamber 35. One end sides of the shaft portions 711, 721, and 731 contact the racks 91, 92, and 93. The springs 75, 76, and 77 are disposed between an inner wall of the housing 34 and outer walls of the racks 91, 92, and 93 to urge the racks 91, 92, and 93 in directions opposite to the valve holes 51, 52, and 53.

According to the present configuration, rotations of the pinions 81, 82, and 83 are transmitted to the racks 91, 92, and 93 under engagement between the pinions 81, 82, and 83 and the gears of the racks 91, 92, and 93. In accordance with the rotations thus transmitted, the racks 91, 92, and 93 linearly shift toward the valve holes 51, 52, and 53. Accordingly, the valve bodies 71, 72, and 73 open the valve holes 51, 52, and 53. More specifically, the racks 91, 92, and 93 respectively press the valve bodies 71, 72, and 73, and therefore the valve holes 51, 52, and 53 are opened and come into a valve open state. When engagement between the pinions 81, 82, and 83 and the racks 91, 92, and 93 is released, the racks 91, 92, and 93 return to initial positions by actions of the springs 75, 76, and 77 that urge the racks 91, 92, and 93 toward the sides opposite to the valve holes 51, 52, and 53.

According to the present embodiment described herein, the three pinions 81, 82, and 83 include the gears 84, 85, and 86 disposed at different positions, respectively. In this case, open/close patterns "A" to "D" are selectable in accordance with a rotation angle of the rotation shaft 74 similarly to the patterns shown in pattern table T in FIG. 5 in the first and second embodiments described above. Accordingly, control similar to the control performed in the first and second embodiments is achievable.

Advantageous effects similar to those of the first embodiment can be offered according to the present embodiment.

Fourth Embodiment

Figure 22:
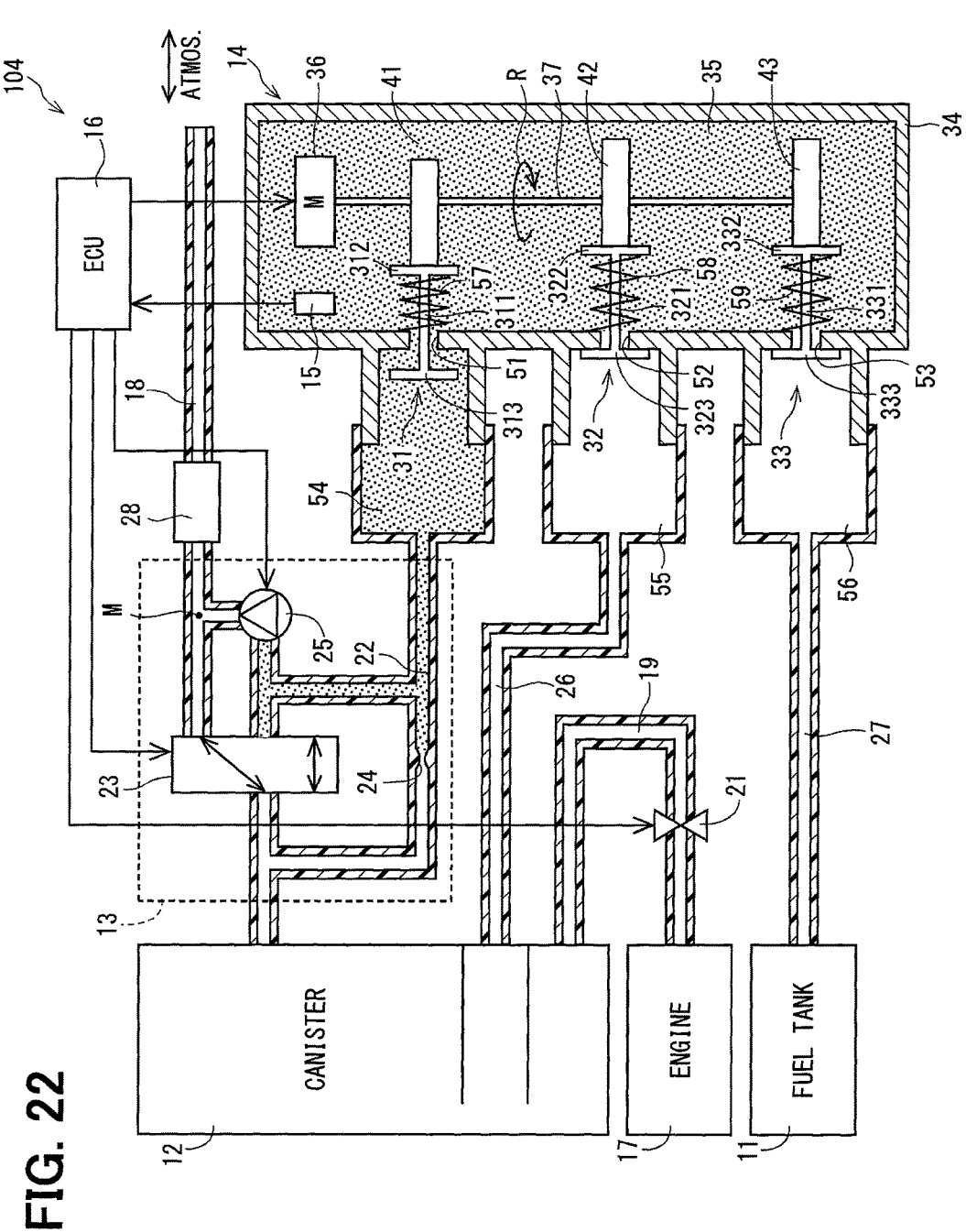
FIG. 22 is a diagram schematically illustrating a fuel vapor processing device according to a fourth embodiment, showing a state during reference pressure detection in pattern "C".

A fuel vapor processing device 104 according to a fourth embodiment of the present disclosure is now described with reference to FIG. 22. Configurations similar to the corresponding configurations in the first embodiment are given similar reference numbers, and the same description is not repeated. The fuel vapor processing device 104 of the present embodiment is different from the fuel vapor processing device 101 of the first embodiment in that a sub canister 28 is further provided. As illustrated in FIG. 22, the sub canister 28 is included in the atmosphere path 18 at a position closer to the atmosphere than a junction position M is. The junction position M is a position at which the bypass path 22 extending from the canister side toward the pump 25 via the orifice 24 joins to the atmosphere path 18. The sub canister 28 includes an absorbent (not shown) that recovers fuel vapor.

According to the present configuration, fuel vapor having entered from the inside of the common valve chamber 35 into the atmosphere path 18 via the first valve chamber 54 is absorbed by the sub canister 28 at the time of switching from open/close pattern "A" to open/close pattern "C" of the three-way valve 14 in S41, for example. Accordingly, a leak of fuel vapor into the atmosphere is avoidable in open/close pattern "C" in which the first valve body 31 opens.

Other Embodiments

According to the embodiments described above, four patterns "A" to "D" are provided as open/close patterns of the three-way valves 14, 60, and 70. However, only either pattern "C" or pattern "D", both corresponding to the canister pressure detection pattern, may be provided as the canister pressure detection pattern. In addition, open/close patterns other than patterns "A" to "D" may be provided.

According to the first and second embodiments, the cam bodies 41, 42, and 43 may have any configurations as long as open/close patterns "A" to "D" can be selected in accordance with a rotation angle of the camshaft 37. The cam bodies 41, 42, and 43 may have shapes other than the shapes described in the above embodiments.

According to the embodiments described above, the valve bodies 31, 32, 33, 71, 72, and 73 may have any shapes, including shapes other than the shapes described in the above embodiments, as long as the valve holes 51, 52, and 53 can be opened or closed by the valve bodies 31, 32, 33, 71, 72, and 73. More specifically, the valve bodies 31 and 71 may have any shapes as long as communicative connection between the first valve chamber 54 and the common valve chamber 35 can be made. Similarly, the valve bodies 32 and 72 may have any shapes as long as communicative connection between the second valve chamber 55 and the common valve chamber 35 can be made. The valve bodies 33 and 73 may have any shapes as long as communicative connection between the third valve chamber 56 and the common valve chamber 35 can be made.

The present disclosure is not limited to the embodiments described herein, but may be practiced in various other modes without departing from the scope of the invention.

What is claimed is:

1. A fuel vapor processing device comprising:
a canister that absorbs a fuel vapor discharged from a fuel tank mounted on a vehicle;
a switching valve provided in an atmosphere path that communicatively connects the canister and an atmosphere, the switching valve switching between a state where the canister is communicatively connected to the atmosphere, and a state where the canister is isolated from the atmosphere;
a pressurizing/depressurizing unit that pressurizes or depressurizes at least any one of the fuel tank, the canister, and a bypass path that extends from the atmosphere path while bypassing the switching valve, and has an orifice at an intermediate position of the bypass path;
a valve mechanism unit including a common valve chamber that houses a first valve body, a second valve body, and a third valve body;
a pressure detection unit provided in the common valve chamber; and
a control unit that controls the valve mechanism unit and the switching valve, and controls the pressurizing/depressurizing unit to perform fuel vapor leak diagnosis for the fuel tank and the canister, based on a detection value detected by the pressure detection unit, wherein
the first valve body enables communication between the common valve chamber and a first valve chamber that is connected between the orifice and the pressurizing/depressurizing unit,
the second valve body enables communication between the common valve chamber and a second valve chamber that communicates with an inside of the canister, and
the third valve body enables communication between the common valve chamber and a third valve chamber that communicates with an inside of the fuel tank.

2. The fuel vapor processing device according to claim 1, wherein
assuming that a state of communication between one of the valve chambers and the common valve chamber is an opened state of the corresponding valve body, and that a state of non-communication between one of the valve chambers and the common valve chamber is a closed state of the corresponding valve body, assuming that an open/close pattern in which the first valve body and the second valve body close and the third valve body opens is a fuel tank pressure detection pattern, assuming that an open/close pattern in which the first valve body closes and the second valve body and the third valve body open is an entire pressure detection pattern, and assuming that a canister pressure detection pattern is an open/close pattern of a first valve chamber communication pattern in which the first valve body opens and the second valve body and the third valve body close, or an open/close pattern of a second valve chamber communication pattern in which the first valve body and the third valve body close and the second valve body opens, the control unit selects any one of the open/close patterns, and performs open/close control of the valve mechanism unit in the selected open/close pattern.

3. The fuel vapor processing device according to claim 2, wherein the control unit sets the valve mechanism unit to the fuel tank pressure detection pattern in the fuel vapor leak diagnosis to diagnose an fuel vapor leak from the fuel tank based on a pressure detected by the pressure detection unit as an internal pressure of the fuel tank.

4. The fuel vapor processing device according to claim 2, wherein assuming that a reference pressure is a pressure detected by the pressure detection unit under driving of the pressurizing/depressurizing unit in the first valve chamber communication pattern set for the valve mechanism unit in a state that the canister communicates with the atmosphere, and assuming that a canister pressure is a pressure detected by the pressure detection unit under driving of the pressurizing/depressurizing unit in the canister pressure detection pattern set for the valve mechanism unit in a state that the canister is isolated from the atmosphere, in the fuel vapor leak diagnosis, the control unit compares the reference pressure and the canister pressure, and diagnoses an fuel vapor leak from the canister based on a comparison result.

5. The fuel vapor processing device according to claim 2, wherein assuming that a reference pressure is a pressure detected by the pressure detection unit under driving of the pressurizing/depressurizing unit in the first valve chamber communication pattern set for the valve mechanism unit in a state that the canister communicates with the atmosphere, assuming that an entire pressure is a pressure detected by the pressure detection unit under driving of the pressurizing/depressurizing unit in the entire pressure detection pattern set for the valve mechanism unit in a state that the canister is isolated from the atmosphere, and in the fuel vapor leak diagnosis, the control unit compares the reference pressure and the entire pressure, and diagnoses an fuel vapor leak from the fuel tank based on a comparison result.

6. The fuel vapor processing device according to claim 2, wherein the control unit sets the fuel tank pressure detection pattern for the valve mechanism unit during parking of the vehicle.

7. The fuel vapor processing device according to claim 2, wherein the control unit sets the entire pressure detection pattern for the valve mechanism unit in a state that the canister communicates with the atmosphere during refueling of the vehicle.

8. The fuel vapor processing device according to claim 2, further comprising:

a purge valve provided in a purge path that communicatively connects the canister and an internal combustion engine, wherein the control unit sets the entire pressure detection pattern for the valve mechanism unit in a state that the canister communicates with the atmosphere during traveling of the vehicle.

9. The fuel vapor processing device according to claim 8, wherein the control unit performs a function diagnosis of the purge valve based on whether a pressure detected by the pressure detection unit is an atmospheric pressure in an opened state of the purge valve.

10. The fuel vapor processing device according to claim 1, wherein the valve mechanism unit further includes a camshaft that transmits power of a motor, and the valve bodies shift for opening and closing in accordance with operations of corresponding cam bodies provided on the camshaft as one piece.

11. The fuel vapor processing device according to claim 10, wherein the common valve chamber is separated, via a separation wall in a housing included in the valve mechanism unit, from a space in which the motor, the camshaft, and the cam bodies are housed.

12. The fuel vapor processing device according to claim 1, wherein an operation mechanism of the valve mechanism unit is provided by a rack-and-pinion.

13. The fuel vapor processing device according to claim 1, further comprising a sub canister provided in the atmosphere path at a position closer to the atmosphere than a junction position is, the junction position being a position at which the bypass path extending from the canister and passing through the orifice joins to the atmosphere path.

* * * * *